Inventors:
Isaac R. Studebaker,
Weldon W. Greutman,
by Gust & Irish
Attorneys.

Inventors:
Isaac R. Studebaker,
Welden W. Greutman,
by Gust & Irish
Attorneys.

United States Patent Office 2,951,180

Patented Aug. 30, 1960

2,951,180

CATHODE-RAY TUBE SYSTEM

Isaac Roger Studebaker, Fort Wayne, Ind., and Weldon Wayne Greutman, Hicksville, Ohio, assignors to International Telephone & Telegraph Corporation Filed Jan. 10, 1958, Ser. No. 708,249

8 Claims. (Cl. 315—24)

Figures 1, 2A, 2B, 3, 4:
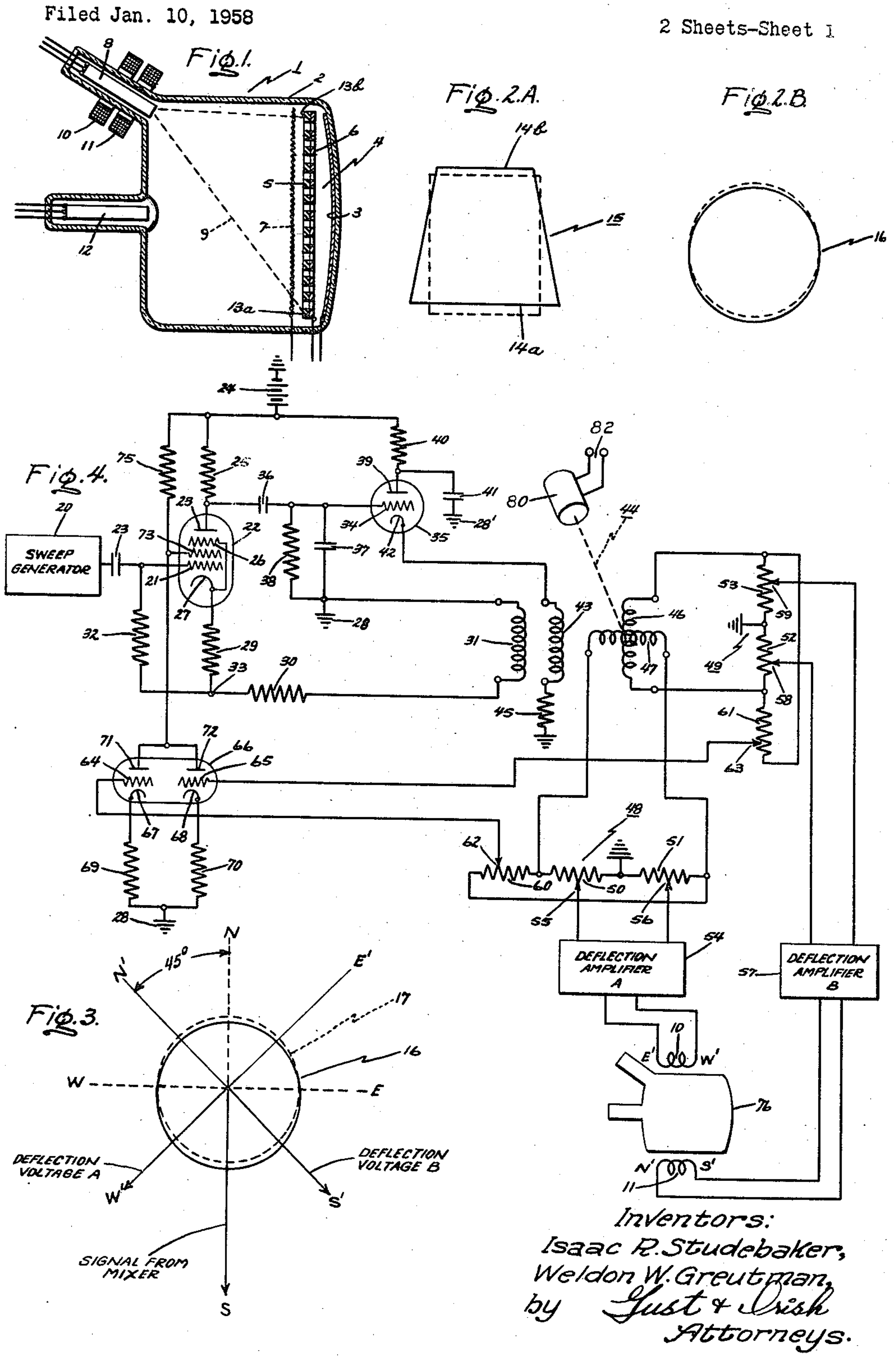

This invention relates to cathode ray tube systems having polar or PPI scanning and more particularly to the correction of keystone distortion encountered in such systems.

So called "keystone" distortion of the displayed image is encountered in various types of cathode ray tubes, for example, signal-to-image charge storage tubes; this keystone distortion arises by virtue of the fact that the electron "writing" beam of the tube emanates from a point source and since it is deflected over a relatively large area surface, i.e., the charge storage screen or the display screen, as the case may be, necessarily provides a longer trace or sweep in areas of the screen which are farther removed from the beam source than other areas.

While numerous circuits and arrangements have been proposed for correcting keystone distortion in cathode ray tube systems having rectilinear or raster scanning, the only system known to the present applicants for correcting keystone distortion in cathode ray tube systems having polar or PPI (plan position indication) scanning is that described in application Serial Number 708,248 now Patent No. 2,913,623 filed January 10, 1958 of Isaac R. Studebaker, one of the inventors of the present application, which application is assigned to the assignee of the present application. In accordance with the teaching of the above-referred to Studebaker application, the deflection elements of the cathode ray tube are arranged so that the deflection axes of the tube are displaced by substantially 45° with respect to the axes of keystone distortion. Sweep voltage generating means and means for resolving the sweep voltage into sine and cosine components are provided in order to provide the polar scanning with two deflection circuits respectively coupling the resolving means to the deflection elements of the tube. In order to correct the keystone distortion, the deflection circuits respectively were provided with means for providing a first gain in the sweep voltage components when the components were polarized to cause scanning in the two quadrants defined by the keystone distortion axes which have contracted distortion and for providing a second gain in the sweep voltage components when the same were polarized to cause scanning in the two quadrants having expanded distortion, the first gain being arranged to be higher than the second gain. In accordance with the prior application of the present inventor Studebaker, therefore, the deflection signal in each quadrant was controlled giving actually only four distinct points of control, the amplitude between the points being controlled only by a sine or cosine function of the azimuth. It is therefore additionally desirable to provide a system in which the sweep voltage, prior to its resolution into sine and cosine components, is automatically varied with respect to the azimuth of deflection in order to correct for changes in deflection sensitivity caused by keystoning.

In accordance with the broader aspects of our invention, therefore, the amplitude of the sweep voltage is varied at any azimuth by comparing selected portions of the sine and cosine components, the result of the comparison being utilized to control the amplitude of the sweep voltage prior to the sine and cosine resolution. As will be more fully explained hereinafter, this system permits correction of keystone distortion regardless of the azimuth of the keystone axis, and the system may be advantageously employed either separately or in conjunction with the system of the aforesaid Studebaker application.

It is therefore an object of this invention to provide a cathode ray tube system having polar scanning with improved means for correcting keystone distortion.

Figure 5:
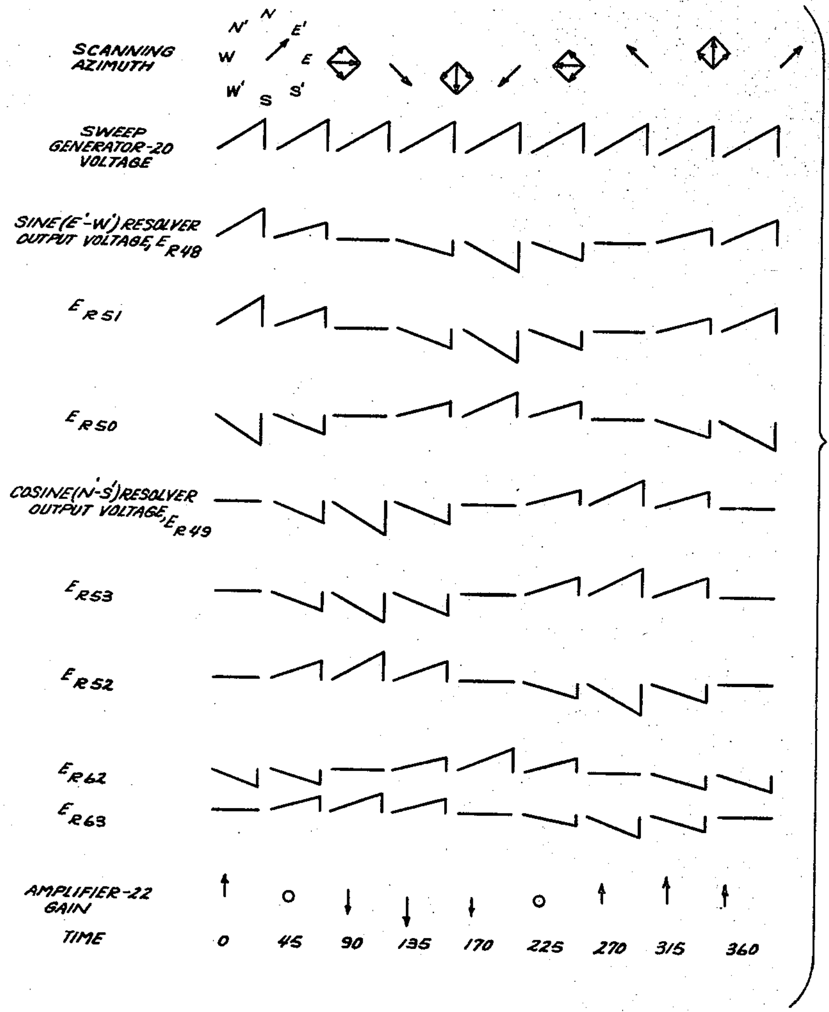

The above-mentioned and other features and objects of this invention and the manner of attaining them will become more apparent and the invention itself will be best understood by reference to the following description of an embodiment of the invention taken in conjunction with the accompanying drawings, wherein:

Fig. 1 is a cross-sectional view of a typical signal-to-image charge storage tube useful in explaining our invention;

Figs. 2*a* and 2*b* show the keystone distortion encountered in the tube of Fig. 1 with rectilinear and polar scanning respectively;

Fig. 3 diagrammatically shows the basic mode of operation of our invention;

Fig. 4 is a schematic diagram showing the preferred embodiment of our invention; and, Fig. 5 is a chart showing the relative polarities and magnitudes of voltages in our system throughout one complete polar scan.

Referring now to Fig. 1, there is shown a typical signal-to-image charge storage tube, generally identified as 1, which comprises an enclosing envelope 2 having a conventional display screen 3 formed at one end thereof. A perforate charge storage screen 4 formed of a dielectric material layer 5 with a metal backing layer 6 is disposed within the envelope 2 and a fine mesh metal collector screen 7 is disposed in front of the dielectric layer 5 of the charge storage screen 4. A conventional electron gun assembly 8 is provided arranged to direct a high velocity "pencil" writing electron beam 9 onto the dielectric layer 5 of the charge storage screen 4. Suitable deflection coils 10 and 11 for causing the writing beam 9 to be scanned over the surface of the charge storage screen 4 are provided associated with electron gun 8; it will be readily understood that conventional electrostatic deflecting plates may be equally advantageously employed for causing the scanning of the electron beam 9. In the conventional form of signal-to-image storage tube 1, the intensity of the high velocity pencil beam 9 is modulated by applying a modulating signal to a control grid of the electron gun 8 (not shown) and impingement of the writing beam upon the dielectric surface 5 of the charge storage screen 4 causes secondary emission therefrom thus leaving a charge image on the charge storage screen 4 responsive to the information contained in the writing beam 9 during its scanning of the charge storage screen. The charge image on the charge storage screen 4 is "read out" by flooding the charge storage screen 4 with a low velocity flood beam of electrons provided by the electron gun 12; the low velocity flood electrons pass through the apertures in the charge storage screen 4 and are modulated in response to the elemental charges thereon thereby to display a replica of the charge image on the display screen 3. It will be readily understood that the particular signal-to-image charge storage tube 1 described above is shown and described here for illustrative purposes only in connection with the explanation of our invention and that other types of cathode ray tubes may be advantageously employed.

Referring now to Fig. 2*a* in addition to Fig. 1, it will be readily seen that the lower extremity 13*a* of the charge storage screen 4 is at a considerably greater distance from the writing electron gun 8 that is the upper extremity 13*b*. Thus, with the arrangement shown, the uppermost horizontal scanning line 14*b* provided by the writing beam 9 in rectilinear or raster scanning will have a width considerably less than the lowermost scanning line 14*a*; inspection of Fig. 2*a* will immediately reveal that the resulting raster pattern 15 provided by rectilinear scanning has a "keystone" shaped configuration and thus this type of distortion is referred to as "keystone" distortion. In the event that polar or PPI scanning is employed in the cathode ray tube 1, the keystone distortion effect is still present as shown in Fig. 2*b*, the resulting image 16 taking the shape of an ellipse. It will be understood that our invention for correcting keystone distortion in cathode ray tubes is applicable to polar or PPI scanning systems and that the keystone distortion effect present in rectilinear scanning systems as shown in Fig. 2*a* is here discussed merely as an aid in explaining keystone distortion.

Referring now to Fig. 3, the normal axes of deflection of the writing beam 9 and the axes of keystone distortion is shown by the dashed lines N—S and W—E, the desired polar scanning pattern being shown by the dashed lines 17 and the actual polar scanning pattern, as distorted by keystoning, being shown at 16. Since the keystoning effect is the result of the geometry of the tube, it will be understood that in the case of polar scanning, the axis of deflection can be shifted without affecting the positioning of the axis of keystone distortion. Thus, as explained in the aforesaid Studebaker application, and with reference to Fig. 3, it will be seen that the deflection axis as indicated by the lines N′—S′ and W′—E′ may be rotated 45° with respect to the normal axis of deflection and the axis of the keystone distortion N—S and W—E. It will now be seen that with the deflection axis so shifted, at the instant when the W′—E′ deflection voltage is negative and the N′—S′ deflection voltage is also negative, the sweep of the tube will be along an azimuth lying on the keystone distortion axis N—S. Inspection of Fig. 3 will further reveal that in the lower two quadrants defined by the axes W—S and S—E, the image has expanded distortion whereas in the upper two quadrants defined by the axis W—N and N—E, the image has contracted distortion. It will now be comprehended that in the particular scanning position as shown in Fig. 3 with the two scanning voltages as shown producing scanning along the N—S azimuth, the two deflection voltages A and B could be mixed and the resulting signal employed appropriately to decrease the amplitude of the sweep voltage prior to its resolution into sine and cosine components thereby to correct the keystone distortion.

Referring now to Fig. 4, there is shown a schematic diagram of our improved cathode ray tube system which incorporates the mode of operation shown in Fig. 3 above. Here we have provided a conventional sweep voltage generator 20 which may provide any desired sweep voltage configuration, such as the saw-tooth, having its output circuit connected to a control grid 21 of a variable gain amplifier tube 22 by a coupling capacitor 23. Amplifier tube 22 has its plate 23 connected to a suitable source of plate potential, such as 300 volts, shown here as being a battery 24, by means of a plate resistor 25. Tube 22 may be of the pentode type and thus its suppression grid 26 is connected to its cathode 27, cathode 27 being serially connected to ground 28 through resistors 29 and 30 and stator coil 31 of resolver 44, to be hereinafter more fully described. Bias resistor 32 is coupled between control grid 21 and point 33 between resistors 29 and 30 as shown.

Plate 23 of variable gain amplifier tube 22 is coupled to control grid 34 of cathode follower tube 35 by a coupling capacitor 36. Capacitor 37 and bias resistor 38 are connected between grid 34 of tube 35 and ground 28 as shown, and the plate 39 of cathode follower tube 35 is connected to the source of positive direct current potential 24 by resistor 40, the resistor 40 and capacitor 41 connecting plate 39 of tube 35 to ground serving to decouple the plate 39 of tube 35 reducing its plate dissipation and preventing surges of current from upsetting the source of positive direct current potential 24. It will be understood that capacitor 37 is employed to shunt high frequency components contained in the feedback loop comprising resistor 38 resolver stator winding 31 and resistors 29 and 30 to ground. The cathode 42 of cathode follower tube 35 is connected in series with stator winding 43 of resolver 44 and bias resistor 45 to ground.

It will now be seen that the sweep voltage generated by the generator 20 is impressed upon the control grid 21 of the variable gain amplifier 22, which in turn impresses the signal developed across plate resistor 25 on control grid 34 of cathode follower tube 35 so that the stator winding 43 of resolver 44 is energized by the sweep voltage. Resolver 44 is employed to resolve the sweep voltage appearing in stator winding 43 into sine and cosine components and is essentially a transformer having two rotatable secondary windings physically displaced by 90°. Thus, resolver 44 includes rotatable secondary windings 46 and 47 which may be rotated at any desired rate by means of a suitable drive motor 80 which in turn is energized from a suitable external source of power (not shown) by lines 82.

A phase splitting or push-pull circuit comprising grounded center tap resistor 48 is connected across secondary winding 47 of resolver 44 and likewise another phase splitting or push-pull circuit 49 comprising another grounded center tap resistor is connected across secondary winding 46. It will thus be readily apparent that oppositely polarized voltages derived from the sine and cosine sweep voltage components appearing respectively across the grounded center tap resistors 48 and 49 will respectively be derived across the resistor sections 50 and 51 of grounded center tap resistor 48 and 52 and 53 of grounded center tap resistor 49.

In order to provide for impressing the sine and cosine component sweep voltages on the deflection coils 10 and 11 of the cathode ray tube 76, which may be a signal-to-image direct viewing storage tube as shown in Fig. 1, a first deflection amplifier 54 has its input circuit respectively connected to adjustable taps 55 and 56 on resistor sections 50 and 51 of grounded center tap resistor 48 and has its output circuit connected to energize deflection coil 10. Likewise, another deflection amplifier 57 is provided having its input circuit connected to adjustable taps 58 and 59 on resistor sections 52 and 53 of grounded center tap resistor 49 and has its output circuit connected to energize deflection coil 11 of cathode ray tube 1. The deflection amplifiers 54 and 57 may be of the type disclosed in the aforesaid Studebaker application if it is desired to effect further keystone distortion correction, or deflection amplifiers 54 and 57 may be conventional amplifiers.

In order to provide for adjustment of the amplitude of the sweep voltage provided by the sweep voltage generator 20, potentiometers 60 and 61 are respectively connected across grounded center tap resistors 48 and 49 as shown with their adjustable taps 62 and 63 being respectively connected to grids 64 and 65 of mixer tube 66. Cathodes 67 and 68 of mixer tube 66 are connected to ground by biasing resistors 69 and 70 while the plates 71 and 72 are connected to the other control grid 73 of variable gain amplifier tube 22 and to the source of positive direct current plate potential 24 by resistor 75. It will now be seen that the adjustable taps 62 and 63 of potentiometers 60 and 61 respectively select voltages responsive to the sine and cosine component sweep voltages appearing across ground center tap resistors 48 and 49, these voltages being impressed upon the grids 64 and 65 of the mixing tubes 66. It will further be seen that the voltages respectively selected by the adjustable taps 62 and 63 on the potentiometers 60 and 61 may be either positive or negative corresponding to the voltages across the resistor sections 50 and 51, and 52 and 53 respectively. Thus, adjustable tap 62 of potentiometer 60 may be selectively adjusted from a positive-going E signal through 0 to a negative-going W signal and likewise adjustable tap 63 of potentiometer 61 may be adjusted from a positive-going north signal through 0 to a negative-going south signal. The feedback loop including resolver winding 31 and resistors 30 and 29 provides a negative feedback to amplifier 22 in order to improve linearity of the output signal.

Referring now to Fig. 5 in conjunction with Fig. 4, the mode of operation of our improved keystone distortion correction system will be explained. Fig. 5 is a chart showing the instantaneous positions or magnitudes of the scanning azimuth, the output of the sweep voltage generator 20, the sine output of the resolver 44 which appears across grounded center tap resistor 48 and is applied to the E′—W′ deflection coil 10 of tube 1, the voltages respectively appearing across resistor sections 50 and 51 of grounded center tap resistor 48, the cosine sweep voltage component appearing across grounded center tap resistor 49 and applied to the N′—S′ deflection coil 11 of tube 1, the voltages respectively appearing across resistor sections 52 and 53, typical voltages which could be selected by adjustable taps 62 and 63 on potentiometers 60 and 61 respectively in order to provide keystone distortion correction, and the resulting influence upon the gain provided by amplifier 22, all at 45° intervals thoughout a complete polar scan.

Referring now to the first column at 0 time, it is assumed that at this instant the sine component appearing across grounded center tap resistor 48 is positive and therefore, of course, the cosine voltage component appearing across grounded center tap resistor 49 will be 0. The scanning azimuth at this instant therefore will be in the E′ direction as shown. It will further be seen that the voltage appearing across resistor section 51 has the same polarity as the voltage appearing across grounded center tap resistor 48 while the voltage appearing across resistor section 50 has the opposite polarity. Assuming now that the adjustable taps 62 and 63 of the potentiometers 60 and 61 are adjusted to select voltages responsive to the voltages appearing across resistor sections 50 and 52 of grounded center tap resistors 48 and 49 respectively, it will be seen that the voltage selected by tap 62 has a negative polarity and is applied to grid 64 of mixer tube 66 and it will further be seen that since the cosine sweep voltage component appearing across grounded center tap resistor 49 is at that instant 0, the voltage selected by the adjustable tap 63 on resistor 61 and applied to cathode 65 of mixer tube 66 will likewise be 0. Application of the negative polarity voltage derived from potentiometer 60 by adjustable tap 62 on the grid 64 of the mixer tube 66 will thus thus reduce the current flow from the source of plate potential 24 through the resistor 75 thus causing an increase in the potential of grid 73 of variable gain amplifier 22 and thus providing an increased gain in the sweep voltage provided by the sweep generator 20 as shown.

During the next interval shown in Fig. 5 at which point the motor 80 has rotated the resolver secondary windings 46 and 47 by 45°, the sine sweep voltage component appearing across grounded center tap resistor 48 will still be positive but of reduced amplitude and the cosine sweep voltage component appearing across center tap resistor 49 will have a negative polarity as shown, thus providing scanning along the E axis as shown. Since the adjustable taps 62 and 63 on the potentiometers 60 and 61 are adjusted to select voltages corresponding to those appearing across resistor sections 50 and 52 of grounded center tap resistors 48 and 49, these voltages having a polarity opposite from the respective sine and cosine voltages appearing across the resistors 48 and 49, it will be seen that the voltage selected by adjustable tap 62 and impressed on grid 64 is negative whereas the voltage selected by tap 63 and applied to grid 65 is positive, the two voltages being of equal magnitude thus providing a 0 or reference gain in amplifier 22 as indicated.

Proceeding to the next 45° interval, it will be seen that the sine sweep voltage component appearing across resistor 48 is now 0 whereas the cosine sweep voltage component across center tap resistor 49 is maximum negative. Thus, the voltage selected by tap 62 and impressed on grid 64 of mixer 66 is 0 whereas the voltage selected by tap 63 and applied to grid 65 of mixer tube 66 is maximum positive. Application of the positive voltage on grid 65 of mixer tube 66 causes an increase in the current flow through resistor 75 thus lowering the potential of control grid 73 and causing decrease in the gain of the sweep voltage signal as indicated. It will be observed that at this interval, the sine and cosine component will provide scanning along the S′ axis as indicated.

Proceeding now another 45° of resolver rotation, it will be seen that the sine sweep voltage component across resistor 48 has now gone negative and the cosine sweep voltage component across grounded center tap resistor 49 is still negative decreasing in magnitude toward 0, thus producing scanning along the S axis as shown. Thus, the two voltages selected by the adjustable taps 62 and 63 on resistors 60 and 61 are both positive and thus when impressed upon the grids 64 and 65 of mixer tube 66 provide a maximum current flow through resistor 75 thus providing a maximum decrease in the gain of tube 22 and thus in the sweep voltage provided in sweep generator 20.

It will now be seen that as the scanning azimuth shifted from the E′ direction around to the S azimuth, the gain of the sweep voltage prior to resolution was decreased to a minimum amount at the 135° point, the gain having been in a positive direction at the E′ azimuth and being then decreased to 0 and then in the negative direction at the S′ and S azimuths. Inspection of Fig. 5 throughout the remaining 45° intervals of the complete scan will indicate that at the W′ scanning azimuth, the gain has been increased over that provided at the S azimuth, at the W azimuth only the reference gain is provided, at the N′ azimuth the gain has been increased, becoming a maximum at the N azimuth. Reference again to Fig. 3 will now indicate that the gain of the sweep voltage signal has been increased from a reference value at the W azimuth to a maximum positive gain along the N azimuth and then decreased to the reference value again at the E azimuth, the gain then being decreased progressively through the S′ axis with a minimum gain being provided at the S axis with the gain again being increased to the reference value at the W axis. Since as previously indicated, the keystoning effect produces contracted distortion in the upper two quadrants and expanded distortion in the lower two quadrants, the variation in gain of the amplifier 22 heretofore described is in a direction to correct for this keystone distortion.

It will now readily be seen that appropriate adjustment of the adjustable taps 62 and 63 on the potentiometers 60 and 61 will provide correction for distortion in any azimuth.

In a circuit constructed in accordance with Fig. 4, the following components were provided:

| | | |
|---|---|---|
| Capacitor **23** | microfarads | .33 |
| Resistor **32** | megohm | 1 |
| Resistor **75** | ohms | 12,000 |
| Tube **22** | | ½6U8 |
| Resistor **25** | ohms | 68,000 |
| Capacitor **36** | microfarads | .33 |
| Resistor **38** | megohm | 1 |
| Capacitor **37** | micromicrofarads | 100 |
| Resistor **29** | ohms | 1,000 |

| | |
|---|---|
| Resistor 30 ohms | 330 |
| Resistor 45 do | 680 |
| Resistor 40 do | 22,000 |
| Capacitor 41 microfarads | 40 |
| Resistor sections 50, 51, 52 and 53 ohms | 10,000 |
| Resistors 60 and 61 do | 25,000 |
| Mixer tube 66 | 12AU7 |
| Resistors 69 and 70 ohms | 680 |

It will now be seen that we have provided an improved cathode ray tube system having polar scanning in which the sweep voltage amplitude is automatically varied with respect to azimuth of deflection thereby to correct for changes in deflection sensitivity caused by keystoning, the correction being applied prior to the derivation of the sine and cosine signal functions which provide the polar scan. It will further be seen that the amount of correction and the azimuth in which the correction is applied is manually controllable by means of the adjustable taps 62 and 63, thus, keystone distortion may be corrected in accordance with our invention regardless of the azimuth of the keystone axis. Our improved system can be used either independently, or in conjunction with the keystone correction apparatus described in the aforementioned Studebaker application.

While we have described above the principles of our invention in connection with specific apparatus, it is to be clearly understood that this description is made only by way of example and not as a limitation to the scope of our invention.

What is claimed is:

1. In combination with a cathode ray tube having a pair of deflection elements; a polar scanning system for said tube providing correction for keystone distortion and comprising sweep voltage generating means, resolving means coupled to said generating means for resolving said sweep voltage into sine and cosine components, said resolving means being coupled to said tube deflection elements for respectively impressing said sine and cosine components thereon thereby to provide said polar scan; and means coupled to said resolving means and to said sweep voltage generating means for comparing voltages respectively responsive to said sine and cosine sweep voltage components and for varying said sweep voltage responsive to said comparison whereby said sweep voltage is varied in accordance with the azimuth of said polar scan thereby to correct said keystone distortion.

2. In combination with a cathode ray tube having a pair of deflection elements; a polar scanning system for said tube providing correction for keystone distortion and comprising sweep voltage generating means, resolving means coupled to said generating means for resolving said sweep voltage into sine and cosine components, said resolving means being coupled to said tube deflection elements for respectively impressing said sine and cosine components thereon thereby to provide said polar scan; means connected in circuit with the output circuits of said resolving means for deriving voltages respectively responsive to said sine and cosine sweep voltage components, and means including mixing means having its input circuits respectively coupled to said deriving means and arranged to compare said derived voltages and having its output circuit coupled to the output circuit of said generating means and arranged to vary said sweep voltages responsive to said comparison whereby said sweep voltage is varied in accordance with the azimuth of said polar scan thereby to correct said keystone distortion.

3. In combination with a cathode ray tube having a pair of deflection elements; a polar scanning system for said tube providing correction for keystone distortion and comprising sweep voltage generating means, resolving means having its input circuit coupled to said generating means by variable gain means and being arranged to resolve said sweep voltage into sine and cosine components, said resolving means having its output circuits respectively coupled to said tube deflection elements for respectively impressing said sine and cosine components thereon thereby to provide said polar scan, means respectively coupled in said resolving means output circuits for deriving voltages respectively responsive to said sine and cosine sweep voltage components, mixing means having its input circuits respectively coupled to said deriving means and arranged to compare said derived voltages, said mixing means having its output circuit coupled to said variable gain means thereby to vary the gain of said sweep voltage responsive to said comparison whereby said sweep voltage is varied in accordance with the azimuth of said polar scan thereby to correct said keystone distortion.

4. In a cathode ray tube system providing correction for keystone distortion: a cathode ray tube having a pair of deflection elements with axes of deflection displaced by substantially 45° from the axes of keystone distortion; and a polar scanning system for said tube comprising sweep voltage generating means, resolving means having its input circuit coupled to the output circuit of said generating means by a variable gain amplifier, said resolving means being arranged to resolve said sweep voltage into sine and cosine components and having its ouput circuits respectively coupled to said tube deflection elements for respectively impressing said sine and cosine sweep voltage components thereon thereby to provide said polar scan, means respectively coupled in said resolving means output circuits for deriving voltages respectively responsive to said sine and cosine sweep voltage components, mixing means having its input circuits respectively coupled to said deriving means and arranged to compare said derived voltages, said mixing means having its output circuit coupled to a control element of said variable gain amplifier thereby to vary the gain of said sweep voltage responsive to said comparison whereby said sweep voltage is varied in accordance with the azimuth of said polar scan thereby to correct said keystone distortion.

5. In combination with a cathode ray tube having a pair of deflection elements; a polar scanning system for said tube providing correction for keystone distortion and comprising sweep voltage generating means, resolving means having its input circuit coupled to said generating means by variable gain means and being arranged to resolve said sweep voltage into sine and cosine components, said resolving means having its output circuits respectively coupled to said two deflection elements for respectively impressing said sine and cosine components thereon thereby to provide said polar scan, selectively adjustable means respectively coupled in said resolving means output circuits for deriving voltages respectively responsive to said sine and cosine sweep voltage components, mixing means having its input circuits respectively coupled to said deriving means and arranged to compare said derived voltages, said mixing means having its output circuit coupled to said variable gain means thereby to vary the gain of said sweep voltage responsive to said comparison whereby said sweep voltage is varied in accordance with the azimuth of said polar scan thereby to correct said keystone distortion.

6. In combination with a cathode ray tube having a pair of deflection elements; a polar scanning system for said tube providing correction for keystone distortion and comprising sweep voltage generating means, resolving means having its input circuit coupled to said generating means by variable gain means and being arranged to resolve said sweep voltage into sine and cosine components, said resolving means having its output circuits respectively coupled to said tube deflection elements for respectively impressing said sine and cosine components thereon thereby to provide said polar scan, means respectively coupled in said resolving means output circuits for respectively deriving opposite polarity voltages from said sine and cosine sweep voltage components, mixing means having its input circuits respectively coupled to said deriving means by selectively adjustable means for comparing the derived voltages respectively selected thereby, said mixing means having its output circuit coupled to said variable gain means thereby to vary the gain of said sweep voltage responsive to said comparison whereby said sweep voltage is varied in accordance with the azimuth of said polar scan thereby to correct said keystone distortion.

7. In a cathode ray tube system providing correction for keystone distortion: a cathode ray tube having a pair of deflection elements with axes of deflection displaced by substantially 45° from the axes of keystone distortion; and a polar scanning system for said tube comprising sweep voltage generating means, resolving means having its input circuit coupled to the output circuit of said generating means by a variable gain amplifier, said resolving means being arranged to resolve said sweep voltage into sine and cosine components and having its output circuits respectively coupled to said tube deflection elements for respectively impressing said sine and cosine sweep voltage components thereon thereby to provide said polar scan, means respectively coupled in said resolving means output circuits for respectively deriving opposite polarity voltages from said sine and cosine sweep voltage components, mixing means having its input circuits respectively coupled to said deriving means by selectively adjustable means for comparing the derived voltages respectively selected thereby, said mixing means having its output circuit coupled to a control element of said variable gain amplifier thereby to vary the gain of said sweep voltage responsive to said comparsion whereby said sweep voltage is varied in accordance with the azimuth of said polar scan thereby to correct said keystone distortion.

8. In a cathode ray tube system providing correction for keystone distortion: a cathode ray tube having a pair of deflection elements with axes of deflection displaced by substantially 45° from the axes of keystone distortion; and a polar scanning system for said tube comprising sweep voltage generating means, resolving means having its input circuit coupled to the output circuit of said generating means by a variable gain amplifier, and being arranged to resolve said sweep voltage into sine and cosine components, each of the output circuits of said resolving means having a grounded center tap resistor connected thereacross thereby respectively deriving opposite polarity voltages from said sine and cosine components, the resistor sections respectively defined by the grounded center tap of each of said grounded center tap resistors respectively having selectively adjustable taps coupled to a respective tube deflection element thereby impressing said sweep voltage sine and cosine components on said deflection elements to provide said polar scan, each of said grounded center tap resistors having another resistor connected thereacross and having a selectively adjustable tap, and a mixer having two input circuits respectively coupled to said other resistor taps for comparing the voltages selected thereby, said mixer having its output circuit coupled to a control element of said variable gain amplifier thereby to vary the gain of said sweep voltage responsive to said comparison whereby said sweep voltage is varied in accordance with the azimuth of said polar scan thereby to correct said keystone distortion.

References Cited in the file of this patent

UNITED STATES PATENTS

| | | |
|---|---|---|
| 2,207,389 | Wendt | July 9, 1940 |
| 2,578,268 | Sherwin | Dec. 11, 1951 |